United States Patent [19]

Cox

[11] Patent Number: 5,113,389
[45] Date of Patent: May 12, 1992

[54] NOISE CANCELLATION

[75] Inventor: Simon A. Cox, Woodbridge, England

[73] Assignee: British Telecommunications public limited company, London, United Kingdom

[21] Appl. No.: 673,151

[22] Filed: Mar. 18, 1991

Related U.S. Application Data

[63] Continuation of Ser. No. 508,536, Apr. 11, 1990, abandoned, which is a continuation of Ser. No. 257,166, Oct. 11, 1980, abandoned, which is a continuation of Ser. No. 823,259, Jan. 28, 1986, abandoned.

[30] Foreign Application Priority Data

Jan. 29, 1985 [GB] United Kingdom ................. 8502182
Jun. 18, 1985 [GB] United Kingdom ................. 8515371

[51] Int. Cl.$^5$ ............................................. H04J 3/00
[52] U.S. Cl. ................... 370/32.1; 379/406; 379/410; 379/411
[58] Field of Search ................. 370/32.1, 32; 379/406, 379/410, 411; 375/14, 102; 333/18, 28 R; 328/162, 165; 364/724.10

[56] References Cited

U.S. PATENT DOCUMENTS

| | | | |
|---|---|---|---|
| 4,064,379 | 12/1977 | Horna | 370/411 |
| 4,074,086 | 2/1978 | Falconer et al. | 379/410 |
| 4,074,086 | 2/1978 | Falconer et al. | 379/410 |
| 4,334,128 | 6/1982 | Snijders | 379/410 X |
| 4,411,006 | 10/1983 | Horna | 379/406 X |
| 4,464,746 | 8/1984 | Snijders et al. | 370/32.1 |
| 4,481,622 | 11/1984 | Cheng et al. | 379/30 |
| 4,527,020 | 7/1985 | Ito | 379/410 |
| 4,531,220 | 7/1985 | Brie et al. | 370/32.1 X |
| 4,578,544 | 3/1986 | Colin de Verdiere et al. | 379/410 |
| 4,613,731 | 9/1986 | Godard | 379/410 |
| 4,621,173 | 11/1986 | Guidoux | 379/411 X |
| 4,695,998 | 9/1987 | Schollmeier et al. | 370/32.1 |

FOREIGN PATENT DOCUMENTS

| | | | |
|---|---|---|---|
| 0036696 | 9/1981 | European Pat. Off. | 370/32.1 |
| 0065796 | 12/1982 | European Pat. Off. | 379/410 |
| 0070236 | 1/1983 | European Pat. Off. | 379/410 |
| 0074089 | 3/1983 | European Pat. Off. | |
| 3327467 | 2/1985 | Fed. Rep. of Germany | 379/406 |
| 59-146231 | 8/1984 | Japan | |
| 1520148 | 8/1978 | United Kingdom | 379/411 |

OTHER PUBLICATIONS

"Larger-Scale Integration of Hybrid-Method Digital Subscriber Loops", Oscar Agazzi et al., IEEE Transactions on Communications, vol. COM-30, No. 9, Sep. 1982, pp. 2095-2108.

"Clock Sensitivity Reduction in Echo Cancellers", S. A. Cox, Electronics Letters, vol. 21, No. 14, 7/4/85 pp. 585-586.

Patents Abstracts of Japan, vol. 4, No. 130(E-25) (612), Sep. 12, 1980 & JP-A 55 82 551 (Nippon Denki K.K.) Jun. 21, 1980.

Primary Examiner—James L. Dwyer
Assistant Examiner—Jhancy Augustus
Attorney, Agent, or Firm—Nixon & Vanderhye

[57] ABSTRACT

In a noise cancellation system an adaptive filter produces a noise cancellation signal. The cancellation signal is compensated in response to indications of timing variations. For a linear traversal filter compensating coefficients (25) are provided which combine with, or relace, their respective primary coefficients when a timing variation occurs. Higher order compensating coefficients may be provided for selected taps and a modular structure is adopted thus facilitating implementation in integtrated form.

86 Claims, 4 Drawing Sheets

NOISE CANCELLATION

This is a continuation of application Ser. No. 07/508,536 filed Apr. 11, 1990, now abandoned which is a continuation of application Ser. No. 07/257,166 filed Oct. 17, 1988 now abandoned, which is a continuation of Ser. No. 06/823,259, filed Jan. 28, 1986, now abandoned.

The present invention relates to noise cancellation and in particular echo cancellation for two-wire to four-wire conversion.

Echo cancellers are known, for example as disclosed in U.S. Pat. No. 4,073,086 of D D Falconer, for providing full duplex data transmission over analogue lines. The echo canceller consists of a transversal filter having a transversal delay with a plurality of taps providing sampling points with a specific delay for a source signal applied to the input of the delay line. The signal samples are each weighted by appropriate weighting coefficients to obtain what are commonly referred to as the tap contributions.

In the case of noise cancellation the tap contributions are summed and said sum is subtracted from an input signal to remove noise present in the input signal which is correlated to the source signal. In echo cancellation, provided at the interface between four-wire transmission and two-wire transmission, the tap contributions may be derived from a near end (source) signal and then subtracted from an input signal containing both a far end signal and echoes of the near end signal-noise.

In order to make the filter adaptive an adaptive update loop is provided for up-dating the weighting coefficients. However adaptation requires a finite time and if the noise present in the input signal undergoes a timing variation, with respect to the cancellation signal, then unsatisfactory cancellation may occur. Such variations take place when the sampling phase of an output transmitter or an input receiver is adjusted to provide, for example, more accurate sampling.

A known approach to mitigating the effect of timing variations is disclosed in a European Patent Application of O A Horna-publication No. 74 089. In Horna samples of the input signal are interpolated and then sampled again before cancellation so that intermediate values are available when a timing variation occurs.

The present invention therefore seeks to provide an improved apparatus for providing noise cancellation which mitigates the effect of timing variations.

According to a first aspect of the invention there is provided noise cancellation apparatus in a system for removing noise from an input signal, comprising a signal processor arranged to receive a noise source signal related to the noise present in the input signal, and to produce a cancellation signal; means for subtractively combining the cancellation signal and the input signal: characterised in that the processor includes means for compensating the cancellation signal in response to timing variations in said noise on receiving an indication that a timing variation has occurred.

The apparatus of the present invention has the advantage of providing means within the signal processor which compensate for timing variations. This provides, amongst other things, improved precision, speed of operation and flexibility for correcting timing variations caused at different locations, and facilitates integration onto a single chip.

Preferably the apparatus is further characterised in that the processor is a transversal digital filter wherein samples are stored as numerical values. Some or all of the taps may have more than one adapted value for generating a coefficient. Preferably some or all of the taps have a secondary adapted value which is added to or subtracted from a primary value on receiving an indication of a timing variation. Some or all the taps may have a plurality of secondary values which are combined to form the most significant terms of a Taylor approximation to the noise signal.

In a preferred embodiment timing variations are intentionally introduced to train the secondary values. Preferably timing variations are introduced continually, while the system is in operation, to adapt the secondary values.

According to a second aspect of the invention there is provided a method of cancelling noise from an input signal by modelling a noise path, wherein a noise source signal is sampled at the transmission rate, a plurality of consecutive samples are stored, each of the stored samples is multiplied by a coefficient stored as a respective primary value, the products of said multiplication are combined to provide a noise cancellation signal, and the noise present in the input signal undergoes timing variations: characterised in that a secondary value is stored for some or all of the coefficients, and the secondary value is arranged to be combined with or to replace the primary value when a timing variation occurs.

Preferably some of the coefficients are formed from more than one secondary coefficient when a timing variation occurs, and said secondary values from the most significant terms of a Taylor approximation to the noise signal.

According to a third aspect of the present invention there is provided as a full duplex modulator/demodulator (modem) including an echo canceller for cancelling noise in an input signal due to transmission of an output signal, the echo canceller including a transversal digital filter having a plurality of coefficients, wherein said noise undergoes timing variations as the sample phase of the modem is adjusted: characterised in that the coefficients are formed by a first stored value, and some coefficients are formed by a second stored value when a timing variation occurs.

Preferably the secondary values are added to or subtracted from the primary values when a timing variation occurs.

The invention will now be described by way of example only with reference to the drawings in which.

Figure 1:
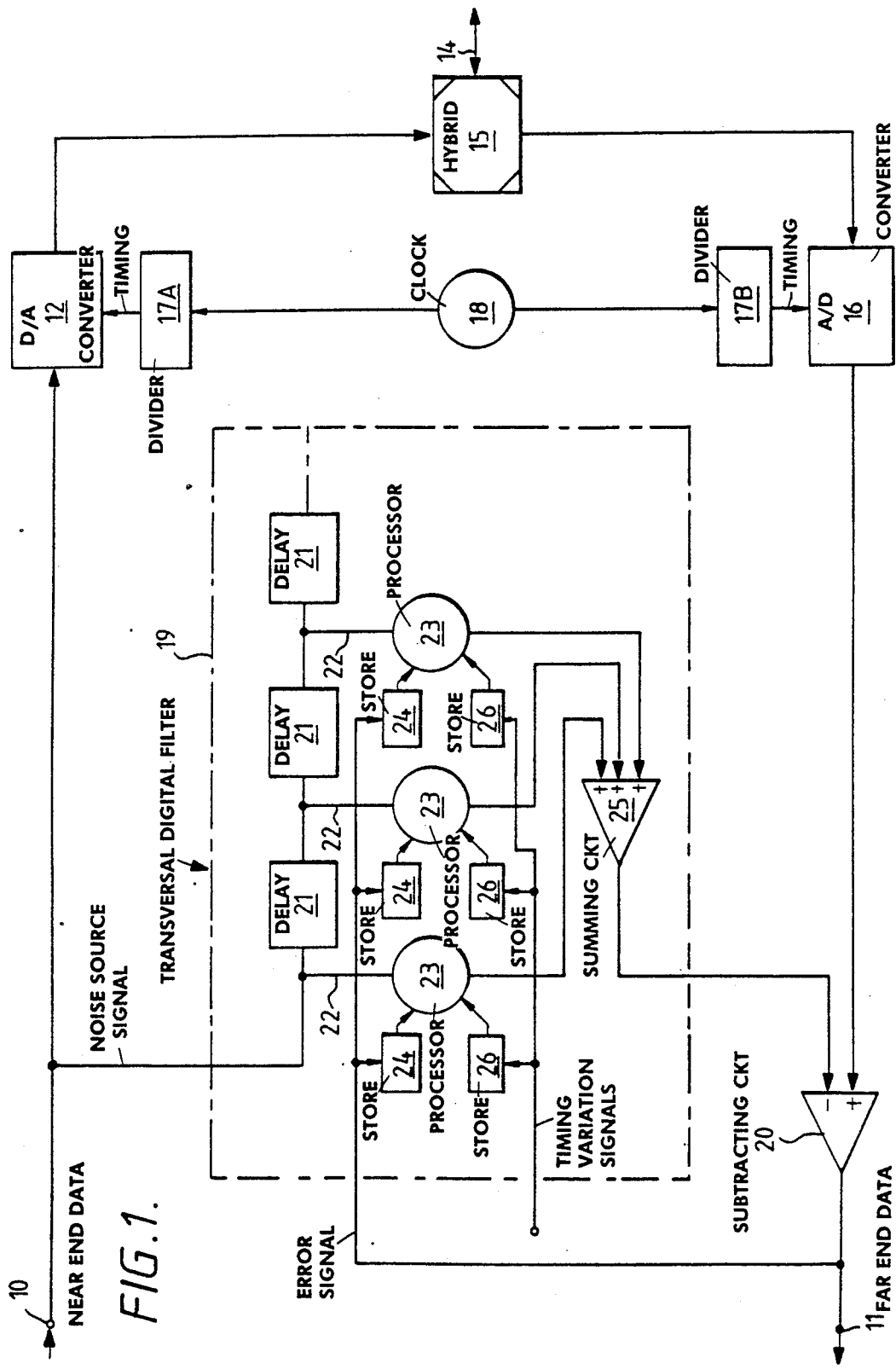
FIG. 1 is a diagrammatic representation of a modem with an echo canceller.

An embodiment of the invention is shown in FIG. 1 as part of an echo cancellation device providing full duplex data transmission over a two wire telephone line. However it should be understood that the invention has many other applications (for example in decision feed-back equalisation and other cancellation systems) where timing variations produce excessive noise.

Near-end data is supplied to a terminal 10 and far-end data is received at terminal 11. The near-end data is converted to an analogue signal by a digital to analogue converter 12 and said analogue signal is supplied over a two-wire transmission line 14 via a hybrid 15. Input signals are received at the hybrid 15 from wire 14 and supplied to a sampling analogue to digital converter 16. A first divider 17A and a second divider 17B divide clock pulses generated by a clock 18 to supply timing pulses for the digital to analogue converter 12 and the analogue to digital converter 16. The value by which the clock pulses are divided is variable.

The hybrid 15 cannot provide complete separation of the output signal from converter 12 and the input signal on line 14 thus a proportion of the output signal is supplied to converter 16. Furthermore the output signal is reflected and thus adds more noise to the input signal. Noise in the input signal due to the transmission of the output signal is cancelled by noise cancellation apparatus consisting of a sampled signal processor (a transversal digital filter) 19, which produces a cancellation signal, and a subtracting circuit 20 which subtractively combines the cancellation signal with the sampled input signal. The resulting digital input signal, with noise removed, provides an error signal to the processor whereby the characteristics of the processor are adapted as described below. The noise in the input signal is related to the data supplied to port 10 therefore this data provides a noise source signal to the processor 19.

Figure 2:
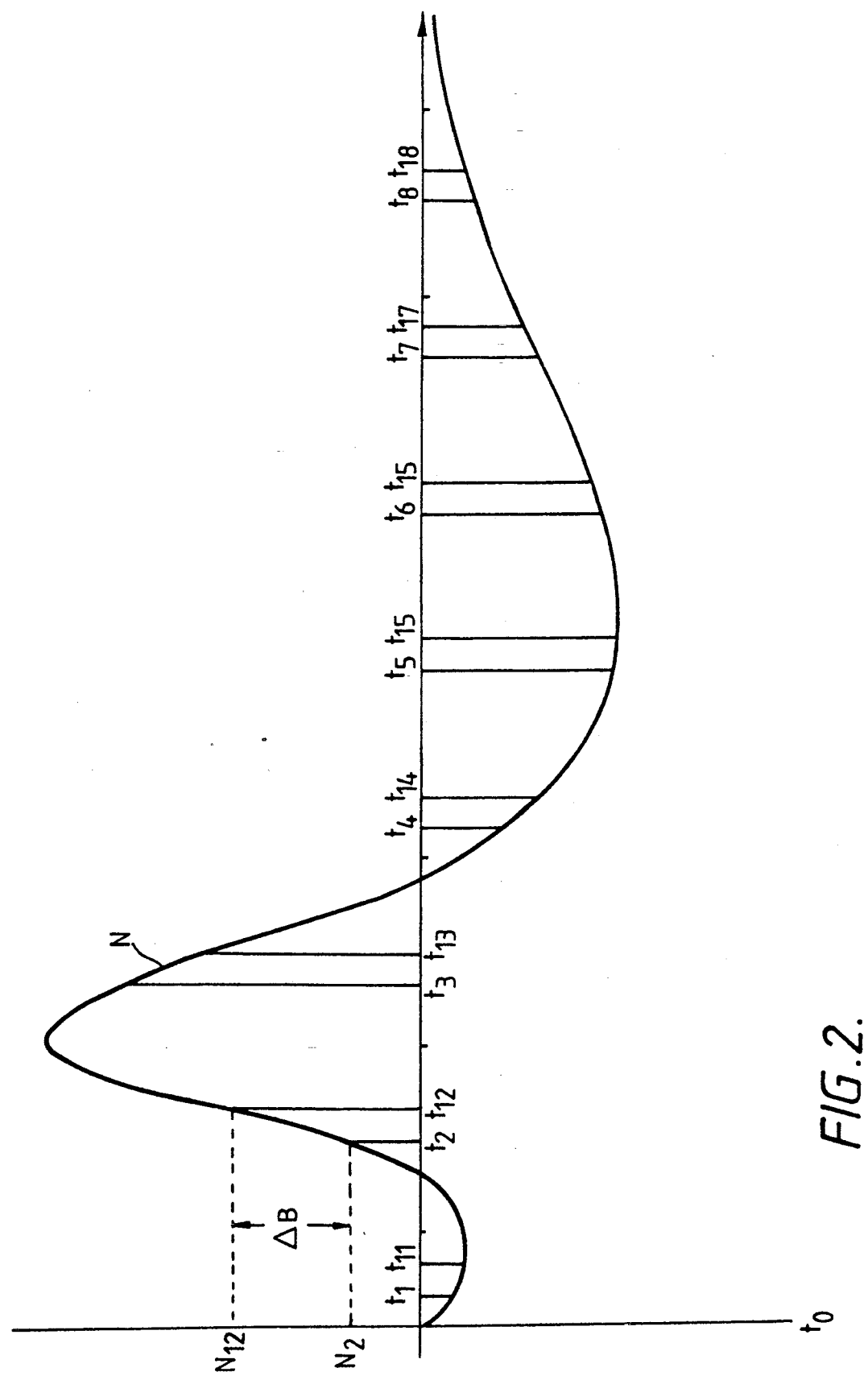
FIG. 2 shows the noise response of the echo canceller of FIG. 1.

The effect of a timing variation at the analogue to digital converter 16 is shown in FIG. 2. An output pulse generated at time $t_o$ produces an input noise response N which is sampled by converter 16 at times t1, t2, t3 etc whence its respective amplitude is N1, N2, N3 etc. Cancellation signals for N1 etc are produced by processor 19 so that the noise is substantially cancelled. If the sampling phase of converter 16 is now shifted such that it samples at times t11, t12, t13 etc the amplitude of the noise signal will be N11, N12, N13 etc, however, the processor 19 will still produce cancellation values of N1, N2, N3 etc. It can be seen from FIG. 2 that the difference between N2 and N12 (delta B) is quite substantial resulting in unsatisfactory cancellation.

Referring back to FIG. 1, the source signal is supplied to a delay line consisting of unit delays 21. The signal from port 10 and the signal from each subsequent delay provide a tap 22 to a respective circuit 23. Each circuit 23 has a respective primary coefficient storage means 24, and forms the product of the tap value and said primary coefficient during each sample period. The outputs from each of the processors 23 are summed by a summer 25 to provide a cancellation signal to subtractor 20. Associated with each circuit 23 is a secondary coefficient storage means 26 which compensate the cancellation signal when a timing variation occurs. In the embodiment of FIG. 1 the compensating coefficients may replace their respective first coefficients but preferably they are combined with their first coefficient.

The structure shown in FIG. 1 is a linear adaptive filter but the principle of storing secondary values which compensate for timing variations may be extended to non-linear structures.

Figure 3:
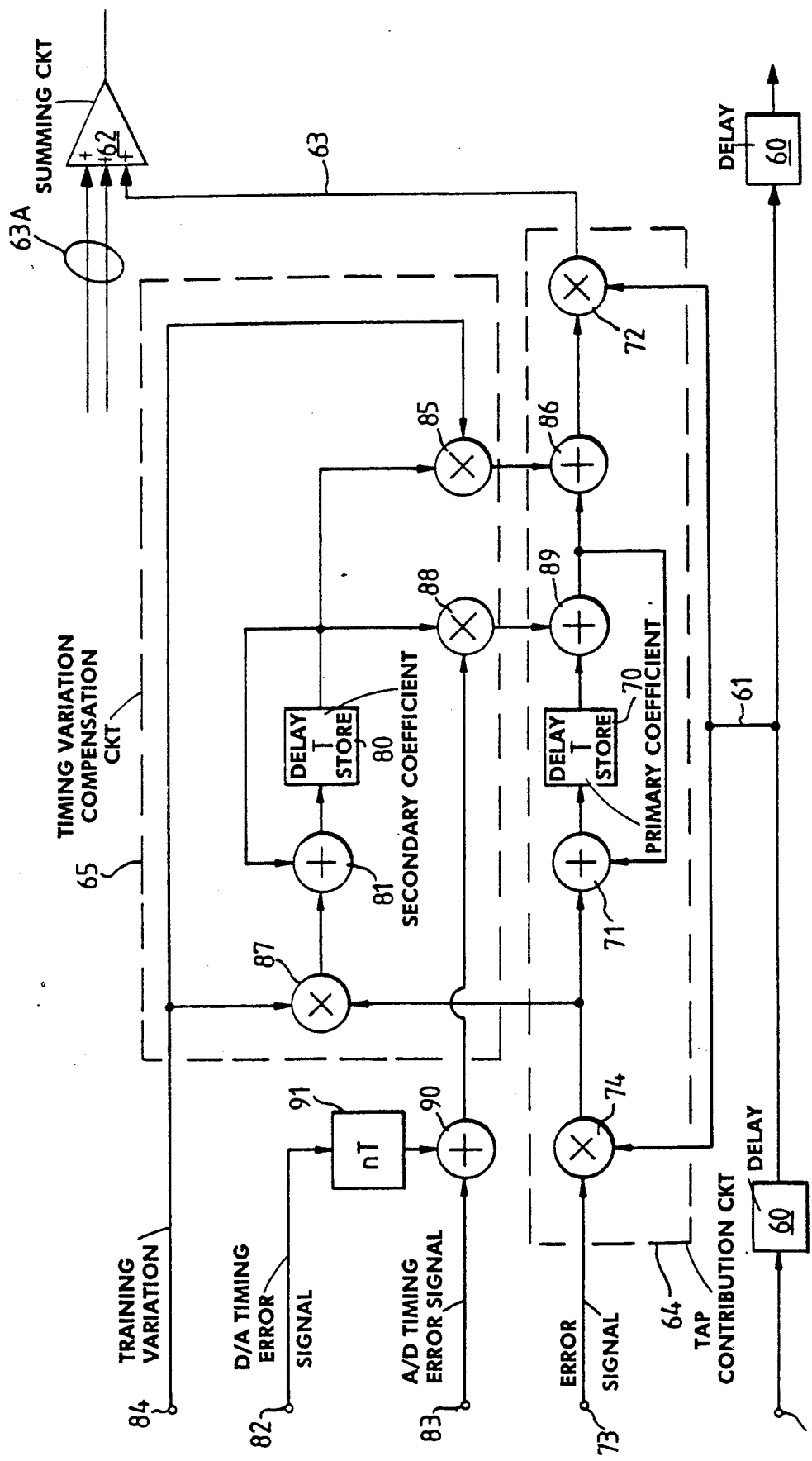
FIG. 3 shows a preferred embodiment of the echo canceller of FIG. 1.

A preferred arrangement for the processor 19 is shown in FIG. 3. Two unit delay devices 60 and a tap 61 are shown. A summer 62 receives a tap contribution on line 63 and other tap contributions on lines 63A. The output from the summer 62 provides the cancellation signal to the subtracting circuit 20. Each tap 61 supplies a circuit 64 which generates the tap contribution and is of a conventional type. In addition a circuit 65 provides compensation for timing variations. The processor 19 has many taps but only a selected number have a compensation circuit 65.

The circuits 64 and 65 will be described with reference to the elements shown in FIG. 3 but it should be noted that these elements relate to the function of the circuits and not necessarily to their physical implementation which may take one of many known forms. The primary coefficient is stored by a unit delay 70 having a feed-back loop to a summer 71. A multiplier 72 forms the product of the tap value and the primary coefficient value to provide a tap contribution on line 63. The error signal is multiplied by a value less than unity and supplied to a port 73. A multiplier 74 multiplies the error signal by the tap value and the result is then combined with the primary coefficient value at summer 71 to provide an adapted primary coefficient.

The secondary coefficient is stored by a unit delay 80 and a summer 81. An indication of a timing variation occuring to the digital to analogue converter 12 (which is conventionally available) is supplied to a port 82, an indication of a timing variation occurring to the analogue to digital converter 16 (which is conventionally available) is supplied to a port 83 and an indication of a timing variation occurring to converter 16 for training purposes (which also is conventionally available) (a training variation) is supplied to a port 84.

The timing variation shown in FIG. 2 is due to the sample phase of converter 16 being retarded by one increment—an indication of this variation is conveyed to port 83 as $-1$. Similarly the phase may be advanced by $+1$ or more $+2$, $+3$ etc. The secondary coefficient value is adapted each time it is brought into use and satisfactory operation is not achieved until it has been used several times. For this reason training variations are introduced to converter 54 either during an initial training period (while the primary coefficient is training up) or preferably continually throughout the operation of the processor. Training variations do not cause the average sampling phase to shift.

The secondary coefficient from delay device 80 is scaled by the indication from port 84 by a multiplier 85 and then added to the primary coefficient by a summer 86 and the (now compensated) primary coefficient is supplied to multiplier 72. The scaled error signal from multiplier 74 is scaled by the indication from port 84 by a multiplier 87, the output from which is supplied to summer 81 to adapt the secondary coefficient.

If the sample phase of converter 16 is adjusted to improve the sampling position then an indication of such a variation is supplied to a multiplier 88 via port 83. The indication then scales the value stored in delay 80 and supplies it to a summer 89. Thus when the secondary coefficient is used to compensate for real timing variations (implementing multiplier 88) the secondary coefficient is not itself adapted. However summer 89 is within the feed back loop of the primary coefficient so that the primary coefficient is permanently compensated.

When a timing variation occurs to converter 51 the indication is supplied to multiplier 88 via a summer 90 and a delay device 91. Tap 61 is subsequent to n delays 60 therefore delay device 91 is equivalent to n unit delays. An indication of a timing variation occuring at the digital to analogue converter 12 must be delayed to prevent compensation of signals which have already been supplied to the line 14.

The noise signal N shown in FIG. 2 is a function of t such that:

$$N = f(t)$$

The processor of FIG. 3 generates values of N for specific values of t but a timing variation shifts t by an amount delta t and the cancellation signal produced by the processor shown in FIG. 3 is compensated by a linear approximation:

$$f(t + \text{delta } t) = f(t) + \text{delta } t \cdot f'(t).$$

This is the first term of a Taylor expansion and a more accurate result is obtained by incorporating the second term such that:

$$f(t + \text{delta } t) = f(t) + \text{delta } t \cdot f'(t) + (\text{delta } t)^2 f''(t)$$

Figure 4:
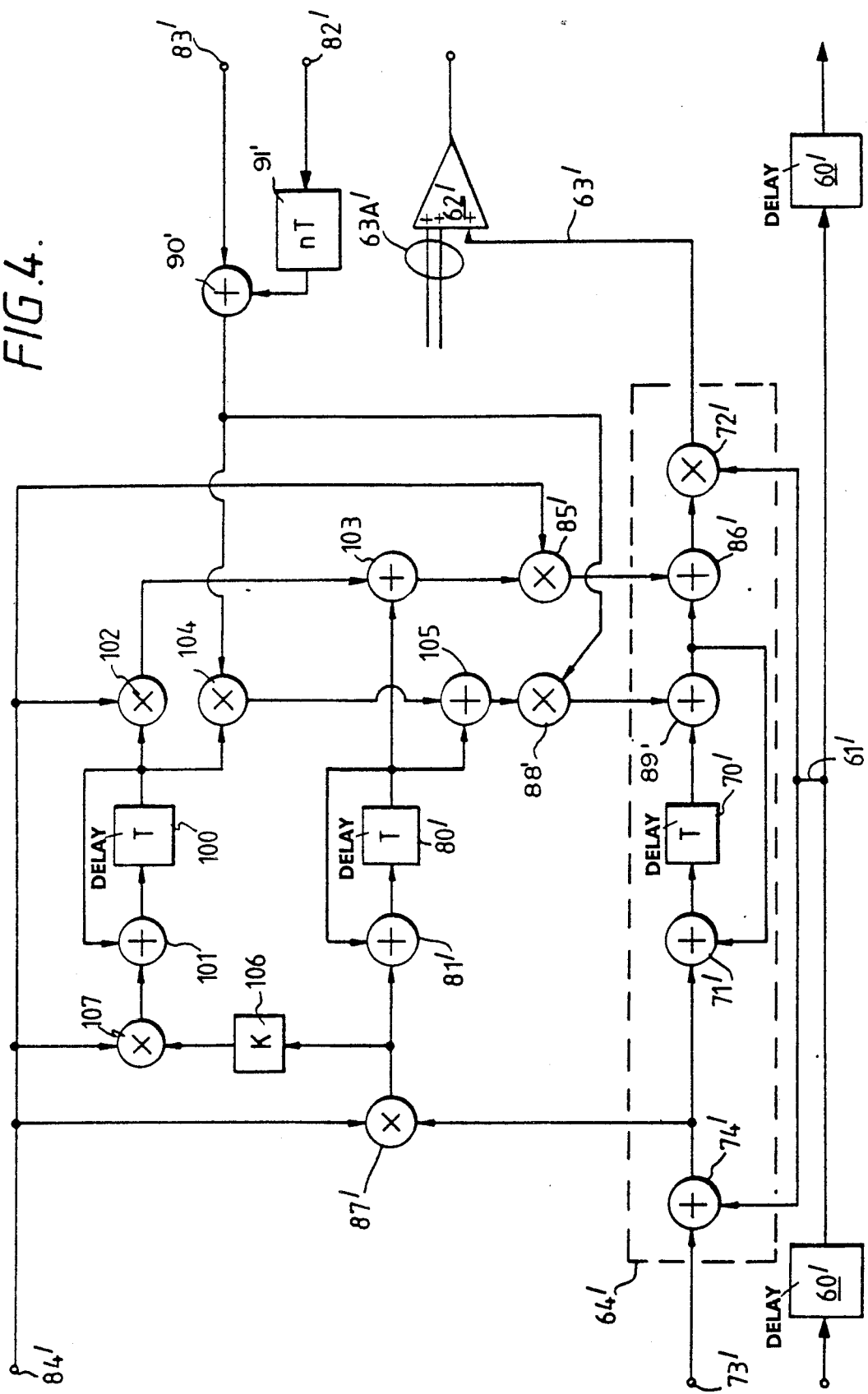
FIG. 4 shows a second preferred embodiment of the echo canceller of FIG. 1.

A second order processor is shown in FIG. 4 in which elements performing a similar function to those shown in FIG. 3 are given the same reference number followed by a prime. A second order compensating coefficient is stored by means of a delay device 100 and a summer 101. The value of the second order coefficient is related to $f''(t)$ at the sampling instants and is multiplied by delta t squared.

During training variations indications of such variations are supplied to port 84' and the output from delay 100 is multiplied by the indication by a multiplier 102 and then added to the output from delay 80' by a summer 103. The output from summer 103 is then multiplied by the indication by multiplier 85'. The output from delay 100 has therefore been multiplied by the square of the indication. A similar procedure is performed for real variations but this is implemented by a multiplier 104 and an adder 105.

The second compensating coefficient is adapted by taking the output from multiplier 87 (which adapts the first compensating coefficient) scaling said output linearly by means of a scaling circuit 106, and multiplying the output from the scaling circuit 106 by the indication at port 84' by a multiplier 107. The indication value is therefore squared when used for updating the second compensating coefficient.

For simultaneous adaptation of all the coefficients the values (e.g. delta t and delta t squared) used for updating the adaptive elements should have mean values of zero, however, this is not possible for squared values.

The output from multiplier 107 may be used to update a third coefficient.

The design lends itself to a cellular structure allowing any number of coefficients, corresponding to higher order terms of the Taylor expansion (e.g. $f'''$ etc.), to be calculated—the circuitry for the third coefficient would be similar to that for the second. However it should be noted that only one odd coefficient and one even coefficient can be adapted simultaneously and independent adaptation periods must be allocated for each pair.

A method of cancelling noise from an input signal may also be provided by modelling a noise path. In this case the noise source signal is sampled at the transmission rate to produce consecutive samples which are stored for processing by a signal processor in which each of the stored samples is multiplied by a coefficient stored as a respective primary value, the products of the multiplication being combined to provide a noise cancellation signal, and a secondary value stored for some or all of the coefficients being arranged to be combined with or to replace the primary value when a timing variation occurs. Some of the coefficients may be formed from more than one secondary value when a timing variation occurs, these secondary values forming the most significant terms of a Taylor approximation to the noise signal.

I claim:

1. Noise cancellation apparatus in a system for cancelling noise in an input signal comprising:
   a signal processor arranged to receive from a noise source a signal related to noise present in said input signal,
   said signal processor including means to produce a cancellation signal substantially corresponding to said noise and means for subtractively combining said cancellation signal with said input signal,
   said noise source including:
   a signal converter,
   means for timing the operation of the signal converter by recurring timing pulses, and
   means connected to said timing means for incrementally changing the phase of said timing pulses and for producing a shift signal indicative of each of said incremental phase changes and for applying said shift signal to said processor so as to provide said processor with a shift signal indicative of each timing variation occurring in said source,
   said processor including means responsive to each said shift signal for effecting a compensatory variation in said cancellation signal corresponding to said incremental phase changes.

2. Noise cancellation apparatus according to claim 1 for use when said signal related to noise present in said input signal is in the form of consecutive samples each being a numerical value, and wherein the signal processor includes a transversal digital filter wherein samples are stored as numerical values.

3. Noise cancellation apparatus according to claim 2 wherein some or all of the taps of the transversal filter have more than one adapted value for generating a coefficient.

4. Noise cancellation apparatus in a system for cancelling noise in an input signal comprising:
   a signal processor arranged to receive from a noise source a signal related to noise present in said input signal,
   said signal processor including means to produce a cancellation signal substantially corresponding to said noise and means for subtractively combining said cancellation signal with said input signal,
   said noise source including means to provide said processor with a shift signal indicative of a timing variation occurring in said source,
   said processor including means responsive to said shift signal to effect a compensatory variation in said cancellation signal,
   said signal processor including a transversal digital filter wherein samples are stored as numerical values and said filter has taps having more than one adapted value for generating a coefficient,
   wherein some or all of the taps have a secondary adapted value which is added to or subtracted from a primary value on receiving an indication of a timing variation.

5. Noise cancellation apparatus according to claim 4 wherein some of the taps have a plurality of secondary values which are combined to form the most significant terms of a Taylor approximation to the noise signal.

6. Noise cancellation apparatus in a system for cancelling noise in an input signal comprising:
a signal processor arranged to receive from a noise source a signal related to noise present in said input signal,
said signal processor including means to produce a cancellation signal substantially corresponding to said noise and means for subtractively combining said cancellation signal with said input signal,
said noise source including means to provide said processor with a shift signal indicative of each timing variation occurring in said source,
said processor including means responsive to each said shift signal to effect a compensatory variation in said cancellation signal,
wherein timing variations are intentionally introduced to train secondary values which determine said compensatory variation.

7. Noise cancellation apparatus according to claim 6 wherein timing variations are introduced continually while the system is in operation to adapt the secondary values to a compensatory value in respect of each timing variation.

8. A method of cancelling noise in an input signal by modelling a noise path, wherein a noise source signal is converted at recurring conversion times corresponding to a transmission rate, a plurality of consecutive values of the noise source signal are stored, each of the stored values is multiplied by a coefficient stored as a respective primary value, the products of said multiplication are combined to provide a noise cancellation signal, and the noise present in the input signal undergoes timing variations by incrementally changing the phase of said conversion times, wherein:
a secondary value is stored for some or all of the coefficients, and
the secondary value is combined with or replaces the primary value in response to each occurrence of an incremental change of phase of said conversion times and thus each time a timing variation in converting the noise signal source occurs.

9. A method of cancelling noise in an input signal by modelling a noise path, wherein a noise signal is converted at recurring conversion times corresponding to a transmission rate, a plurality of consecutive values of the noise source signal are stored, each of the stored values is multiplied by a coefficient stored as a respective primary value, the products of said multiplication are combined to provide a noise cancellation signal, and the noise present in the input signal undergoes timing variations by incrementally changing the phase of said conversion times, wherein:
a secondary value is stored for some or all of the coefficients, and
the secondary value is combined with or replaces the primary value in response to each occurrence of an incremental change of phase of said conversion times and thus when a timing variation in converting of the noise signal source occurs; and
wherein some of the coefficients are formed from more than one secondary coefficient when a timing variation occurs, and said secondary values are formed from the most significant terms of a Taylor approximation to the noise signal.

10. A method of cancelling noise in an input signal by modelling a noise path, wherein a noise source signal is sampled at a transmission rate, a plurality of consecutive samples are stored, each of the stored samples is multiplied by a coefficient stored as a respective primary value, the products of said multiplication are combined to provide a noise cancellation signal, and the noise present in the input signal undergoes timing variations, wherein:
a secondary value is stored for some or all of the coefficients, and
the secondary value is arranged to be combined with or to replace the primary value each time a timing variation in sampling of the noise source signal occurs,
and including intentionally introducing timing variations to train the secondary values to a compensatory value in respect of each timing variation.

11. A full duplex modulator/demodulator including an echo canceller for cancelling noise in an input signal due to transmission of an output signal, the echo canceller including a transversal digital filter having a plurality of coefficients, said modulator/demodulator including means for sampling said input signal at successive sampling times and for incrementally adjusting the phase of said sampling times and for providing a shift signal indicative of each of said incremental phase adjustments, wherein said noise undergoes timing variations as the sampling time phase of the modem is adjusted and wherein the coefficients are formed by a first stored primary value, and some coefficients are instantaneously formed by a second stored secondary value in response to a said shift signal.

12. A full duplex modem according to claim 11 wherein the secondary values are added to or subtracted from the primary values when a timing variation occurs.

13. In a duplex digital data communication system wherein digital samples represent respective values of corresponding analog signals at conversion times which may be incrementally shifted in phase from time to time to compensate for timing signal variations and wherein a shift signal indicative of each such incremental phase shift is available, an arrangement comprising:
an adaptive echo-cancelling circuit which uses a transversal filter with associated tap coefficients to generate an echo-cancelling signal; and
a conversion time variation compensation circuit which is connected to respond to each said shift signal by changing the tap coefficients used by said echo-cancelling circuit and thus more quickly adapting said echo-cancelling signal to phase shifting of said conversion timing occurrences.

14. Noise cancellation apparatus in a system for removing noise in an input signal including:
a signal processor arranged to receive from a noise source a signal related to noise present in said input signal,
said signal processor including means to produce a cancellation signal substantially corresponding to said noise and means for subtractively combining said cancellation signal with said input signal,
said noise source including:
signal conversion means;
means for timing the operation of the signal conversion means by recurring timing pulses, and
means connected to said timing means for incrementally changing the phase of said timing pulses and for producing a first shift signal indicative of each of said incremental phase changes of said timing pulses and for applying said first shift signal to said processor so as to provide said processor with a first shift signal indicative of each timing variation occurring in said operation of the signal conversion means, said system further including:

means for sampling said input signal at recurring sampling times, and means connected to said sampling means for incrementally changing the phase of said sampling times and for producing a second shift signal indicative of each of said incremental phase changes of said sampling times and for applying said second shift signal to said processor so as to provide said processor with a second shift signal indicative of each timing variation occurring in the operation of said sampling means, said processor including means responsive to each said first and second shift signals for effecting a compensatory variation in said cancellation signal corresponding to said incremental phase changes.

15. Noise cancellation apparatus according to claim 14 and for use when said signal related to noise present in said input signal is in the form of consecutive samples each being a numerical value, wherein the signal processor includes a transversal digitial filter means for storing samples as numerical values.

16. Noise cancellation apparatus according to claim 15 wherein some or all of the taps of the transversal filter have more than one adapted value for generating a coefficient.

17. A method of cancelling noise in an input signal by modelling a noise path, wherein a noise source signal in the form of consecutive values is converted for transmission in accordance with timing pulses at a transmission rate, a plurality of said consecutive values are stored, each of the stored values is multiplied by a coefficient stored as a respective primary value, the products of said multiplication are combined to provide a noise cancellation signal, and noise present in the input signal is subject to timing variations due to incrementally changing the phase of said timing pulses, and wherein:

a secondary value is stored for some or all of the coefficients, and the secondary value is combined with or replaces the primary value in response to each occurrence of an incremental change of phase of said timing pulses and thus each time a timing variation in the conversion of the noise source signal occurs.

18. A method of cancelling noise in an input signal by modelling a noise path, wherein a noise source signal in the form of consecutive values is converted for transmission in accordance with timing pulses at a transmission rate, a plurality of said consecutive values are stored, each of the stored values is multiplied by a coefficient stored as a respective primary value, the products of said multiplication are combined to provide a noise cancellation signal, and noise present in the input signal is subject to timing variations due to incrementally changing the phase of said timing pulses, wherein:

a secondary value is stored for some or all of the coefficients, and the secondary value is combined with or replaces the primary value in response to each occurrence of an incremental change of phase of said timing pulses and thus each time a timing variation in the conversion of the noise source signal occurs; and wherein some of the coefficients are formed from more than one secondary coefficient when a timing variation occurs and said secondary values are formed from the most significant terms of a Taylor approximation to the noise signal.

19. A full duplex modulator/demodulator (modem) including an echo canceller for cancelling noise in an input signal due to transmission of an output signal, the echo canceller including a transversal digital filter having a plurality of coefficients, said modulator/demodulator including conversion means for converting a noise signal to produce said output signal, and means for controlling the operation of said conversion means in accordance with successive timing pulses and for providing a shift signal indicative of each of said incremental phase adjustments and for incrementally adjusting the phase of said timing pulses, wherein said noise undergoes timing variations as the conversion time phase of the moden is adjusted and wherein the coefficients are formed by a first stored primary value, and some coefficients are instantaneously formed by a second stored secondary value in response to a said shift signal.

20. A full duplex modem according to claim 19 wherein the secondary values are added to or subtracted from the primary values when a timing variation occurs.

21. In a duplex digital data communication system wherein a data signal is converted for transmission and the conversion is controlled in accordance with successive timing pulses which may be incrementally shifted in phase from time to time to compensate for timing signal variation and wherein a shift signal indicative of each such incremental phase shift is available, there is provided;

an adaptive echo-cancelling circuit which uses a transversal filter with associated tap coefficients to generate an echo-cancelling signal; and a conversion time variation compensation circuit which is connected to respond to each said shift signal by changing the tap coefficients used by said echo-cancelling circuit and thus more quickly adapting said echo-cancelling signal to phase shifting of said timing pulse occurrences.

22. A method of cancelling noise in an input signal by modelling a noise path, wherein a noise source signal in the form of consecutive values is converted for transmission in accordance with timing pulses at a transmission rate, a plurality of said consecutive values are stored, each of the stored values in multiplied by a coefficient stored as a respective primary value, the products of said multiplication are combined to provide a noise cancellation signal, and the noise present in the input signal undergoes timing variations by incrementally changing the phase of said timing pulses, said method comprising the following steps:

(a) sampling the input signal at recurring sampling times, (b) incrementally changing the phase of said sampling times, (c) storing a secondary value for some or all of the coefficients, and (d) combining or replacing the primary value of a coefficient with the secondary value of that coefficient in response to each occurrence of an incremental change of phase of said timing pulses and of said sampling times.

23. A method of cancelling noise in an input signal by modelling a noise path, wherein a noise source signal in the form of consecutive values in converted for transmission in accordance with timing pulses at a transmission rate, a plurality of said consecutive values are stored, each of the stored values is multiplied by a coefficient stored as a respective primary value, the products of said multiplication are combined to provide a noise cancellation signal, and the noise present in the input signal undergoes timing variations by incrementally changing the phase of said timing pulses, said method comprising the following steps:

(a) sampling the input signal at recurring sampling times, (b) incrementally changing the phase of said sampling times, (c) storing a secondary value for some or all of the coefficients, (d) combining or replacing the primary value of a coefficient with the secondary value of that coefficient in response to each occurrence of an incremental change of phase of said timing pulses and of said sampling times, (e) forming some of the coefficients from more than one secondary coefficient when a timing variation occurs, and (f) forming said secondary values from the most significant terms of a Taylor approximation to the noise signal.

24. A method as in claim 23 further including delaying said combining or replacing with respect to occurrence of said incremental change of phase of said timing pulses by a propagation time delay.

25. A full duplex modulator/demodulator (modem) including:

an echo canceller for cancelling noise in an input signal due to transmission of an output signal, the echo canceller including a transversal digital filter having a plurality of coefficients;

send conversion means for converting a noise signal at successive conversion times to produce said output signal;

means operatively coupled to said send conversion means for controlling the conversion times of said send conversion means in accordance with successive timing pulses and for incrementally adjusting the phase of said timing pulses and for providing a first shift signal indicative of each of said incremental phase adjustments of said timing pulses;

receive sampling means connected to receive said input signal;

means operatively coupled to said receive sampling means for controlling the sampling times of said receive sampling means in accordance with successive sampling times and for incrementally adjusting the phase of said sampling times and for providing a second shift signal indicative of each of said incremental phase adjustments of said sampling times, said noise undergoing timing variations as either or both of said conversion and sampling times of the modem is (are) incrementally adjusted in phase;

means for (a) forming said coefficients in response to respective stored primary values, and (b) instantaneously forming some of said coefficients in accordance with respective stored secondary values in response to said first and second shift signals.

26. A full duplex modem according to claim 25 further characterized in that the secondary values are added to or substracted from the primary values when a timing variation occurs.

27. In a duplex digital data communication system wherein a data signal is converted for transmission and the conversion times are controlled in accordance with successive timing pulses which may be incrementally shifted in phase from time to time to compensate for timing signal variations and a first shift signal indicative of each such incremental phase shift in conversion times is available, and wherein digital sample signals represent respective values of corresponding analog signals at sample times which may be incrementally shifted in phase from time to time to compensate for timing signal variations and wherein a second shift signal indicative of each such incremental phase shift in sample times is available, there is provided:

an adaptive echo-cancelling circuit which uses a transversal filter with associated tap coefficients to generate an echo-cancelling signal; and a timing signal variation compensation circuit which is connected to respond to each of said first and second shift signals by changing the tap coefficients used by said echo-cancelling circuit and thus more quickly adapting said echo-cancelling signal to phase shifting of said timing occurrences.

28. In a duplex digital data communication system wherein digital signals correspond to respective values of corresponding analog signals at conversion times which may be incrementally shifted in phase from time to time to compensate for timing signal variations and wherein a shift signal instantaneously indicative of each such incremental phase shift is available, there is provided:

an adaptive echo-cancelling circuit which uses a transversal filter with associated tap coefficients to generate an echo-cancelling signal; and a conversion time variation compensation circuit which is connected to respond to each said shift signal by changing the tap coefficients used by said echo-cancelling circuit and thus more quickly adapting said echo-cancelling signal to phase shifting of said conversion timing occurrences, said compensation circuit including delay means for delaying, by a predetermined propagation delay period, the instant said tap coefficients are changed in response to a particular incremental phase shift with respect to the time of occurrence of said incremental phase shift.

29. A method of cancelling noise in an input signal by modelling a noise path comprising the following steps:

(a) generating timing pulses establishing a transmission rate;

(b) converting a noise source signal in the form of consecutive values for transmission in response to said timing pulses;

(c) incrementally changing the phase of said generated timing pulses, thereby subjecting noise present in the input signal to timing variations;

(d) receiving and storing a plurality of said noise source signal consecutive values;

(e) providing a primary value coefficient and also providing a secondary value corresponding to said primary value coefficient;

(f) adapting the primary value coefficient to said secondary value upon each occurrence of an incremental change of phase of said timing pulses and thus each time a timing variation in the conversion of the noise signal source occurs;

(g) multiplying each of the stored values by said adapted primary value coefficient to provide products; and (h) combining said products to provide a noise cancellation signal.

30. A duplex digital data communication system comprising:

sending circuit digital-to-analog conversion means connected to receive input digital signal values for converting said digital values to respective analog signals at successive recurring conversion times;

timing means connected to said sending circuit conversion means for incrementally shifting said successive recurring conversion times in phase from time to time and for providing a shift signal instantaneously indicative of each such incremental phase shift;

an adaptive echo-cancelling circuit including transversal filter means having associated tap coefficients for generating an echo-cancelling signal; and conversion time variation compensation means connected to respond to each said shift signal for changing the tap coefficients used by said echo-cancelling circuit in response to each said shift signal and for thus more quickly adapting said echo-cancelling signal to phase shifting of said conversion timing occurrences, said compensation means including delay means for delaying, by a predetermined propagation delay period, the instant said tap coefficients are changed in response to a particular incremental phase shift with respect to the time of occurance of said incremental phase shift.

31. An arrangement as in any one of claims 11, 17, 19, and 25 further including means for adapting said primary value in response to said secondary value.

32. A method as in any one of claims 8, 9, 17, 18, 22 and further including adapting said primary value in response to said secondary value.

33. An arrangement as in either claim 1 or claim 14 further including delay means for delaying the effecting of said compensatory variation with respect to occurance of said incremental phase change by a propagation delay time.

34. An arrangement as in any of claims 13, 21 and 27 further including delay means for delaying the operation of said compensation circuit with respect to occurance of said incremental phase shift by propagation delay time.

35. An arrangement as in either claim 11 or claim 19 further including delay means for delaying said shift signal with respect to occurrence of said incremental phase adjustment by a propagation delay time.

36. An arrangement as in claim 25 further including delay means for delaying said first shift signal with respect to occurrence of said incremental phase adjustment by a propagation delay time.

37. A method as in any one claims 8, 9, 17, 18, 22 and 24 further including delaying the provision of the noise cancellation signal with respect to occurrence of said incremental phase change by a propagation delay time.

38. An arrangement as in either claim 1 or claim 14 wherein said processor effects compensatory variation in response to receipt of each said shift signal.

39. Noise cancellation apparatus in a system for cancelling noise in an input signal in a receive path comprising:

a signal processor arranged to receive from a noise source in a transmit path a signal related to noise present in said input signal, said signal processor including means to produce a cancellation signal substantially corresponding to said noise and means for subtractively combining said cancellation signal with said input signal;

means for timing by recurring timing pulses the operation of signal conversion means;

means connected to said timing means for incrementally changing the phase of timing pulses applied to said signal conversion means and for producing a shift signal indicative of the occurrence of each of said incremental phase changes and for applying said shift signal to said processor so as to provide said processor with shift signal indicative of each timing variation occurring in said signal conversion means, said processor including compensation means for at least initiating a compensatory variation is said cancellation signal corresponding to each said incremental phase change upon receipt of each said shift signal.

40. Noise cnacellation apparatus according to claim 39 for use when said signal related to noise present in said input signal is in the form of consecutive samples each being a numerical value, and wherein the signal processor includes a transversal digital filter wherein samples are stored as numerical values.

41. Noise cancellation apparatus according to claim 40, wherein some or all of the taps of the transversal filter have more than one adapted value for generating a coefficient.

42. Noise cancellation apparatus according to claim 41, wherein some or all of the taps have a secondary adapted value which is added to or subtracted from a primary value on receiving an indication of a timing variation.

43. Noise cancellation apparatus according to claim 42, wherein some of the taps have a plurality of secondary values which are combined to form the most significant terms of a Taylor approximation to the noise signal.

44. Noise cancellation apparatus according to claim 43, wherein timing variations are intentionally introduced to train the secondary values.

45. Noise cancellation apparatus according to claim 44, wherein timing variations are introduced continually while the system is in operation to adapt the secondary values to a compensatory value in respect of each timing variation.

46. A method of cancelling noise in an input signal in a receive path by modelling a noise path, wherein a noise source signal is converted at recurring conversion times conrresponding to a transmission rate, a plurality of consecutive values of the noise source signal are stored, each of the stored values is multiplied by a coefficient stored as a respective primary value, the products of said multiplication are combined to provide a noise cancellation signal, and the noise present in the input signal undergoes timing variations by incrementally changing the phase of conversion times of signal conversion means for converting said input signal, wherein:

a secondary value is stored for some or all of the coefficients, and the secondary value is combined with or replaces the primary value upon each occurance of an incremental change of phase of said conversion times of said signal conversion means.

47. A method of cancelling noise according to claim 46, wherein some of the coefficients are formed from more than one secondary coefficient when a timing variation occurs, and said secondary values are formed from the most significant terms of a Taylor approximation to the noise signal.

48. A method of cancelling noise according to claim 46, and including intentionally introducing timing variations to train the secondary values of a compensatory value in respect of each timing variation.

49. A full deplex modulator/demodulator (modem) including an echo canceller for cancelling noise in an input signal in a receive path due to transmission of an output signal, the echo canceller including a transversal digital filter having a plurality of coefficients, said modem including conversion means arranged to convert at least one of said input signal and said output signal at (respective) successive conversion times and for incrementally adjusting the phase of said conversion times and for providing a (respective) shift signal indicative of the occurance of each of said incremental phase adjustments, wherein said noise undergoes timing variations as the conversion time phase of the modem is adjusted and wherein the coefficients are formed by a first stored primary value, and at least one coefficient is instantaneously formed by a second stored secondary value in response to receipt of a said shift signal.

50. A full duplex modem according to claim 49, wherein the secondary values are added to or subtracted from the primary values when a timing variation occurs.

51. In a duplex digital data communication system wherein digital sample signals represent respective values of corresponding analog signals at conversion times which may be incrementally shifted in phase from time to time to compensate for timing variations and wherein a shift signal indicative of the occurance of each such incremental phase shift is available, there is provided:

an adaptive echo-cancelling circuit which uses a transversal filter with associated tap coefficients to generate an echo-cancelling signal; and a conversion time variation compensation circuit which is connected to change at least the first of the tap coefficients used by said echo-cancelling circuit upon receipt of each said shift signal and thus more quickly adapt said echo-cancelling signal to phase shifting of said conversion timing occurrances.

52. Noise cancellation apparatus in system for removing noise in an input signal in a receive path including:

a signal processor arranged to receive from a noise source in a transmit path a signal related to noise present in said input signal, said signal processor including means to produce a cancellation signal substantially corresponding to said noise and means for subtractively combining said cancellation signal with said input signal, said noise source including:
signal conversion means;
means for timing the operation of the signal conversion means by recurring timing pulses, and means connected to said timing means for incrementally changing the phase of said timing pulses and for producing a first shift signal indicative of the occurrence of each of said incremental phase changes of said timing pulses and for applying said first shift signal to said processor so as to provide said processor with a first shift signal indicative of each timing variation occurring in the operation of the signal conversion means, said system further including:
means for sampling said input signal at recurring sampling times, and means connected to said sampling means for incrementally changing the phase of said sampling times and for producing a second shift signal indicative of the occurence of each of said incremental phase changes of said sampling times and for applying said second shift signal to said processor so as to provide said processor with a second shift signal indicative of each timing variation occuring in the operation of said sampling means, said processor including compensation means for at least initiating a compensatory variation in said cancellation signal corresponding to said incremental phase changes upon receipt of each said first and second shift signals.

53. Noise cancellation apparatus according to claim 52, and for use when said signal related to noise present in said input signal is in the form of consecutive samples each being a numerical value, wherein the signal processor includes a transversal digital filter means for storing samples as numerical values.

54. Noise cancellation apparatus according to claim 53, wherein some or all of the taps of the transversal filter means have more than one adapted value for generating a coefficient.

55. A method of cancelling noise in an input signal in a receive path by modelling a noise path, wherein a noise source signal in the form of consecutive values is converted for transmission in accordance with timing pulses at a transmission rate, a plurality of said consecutive values are stored, each of the stored values is multiplied by a coefficient stored as a respective primary value, the products of said multiplication are combined to provide a noise cancellation signal, and noise present in the input signal is subject to timing variations due to incrementally changing the phase of said timing pulses, and wherein:

a secondary value is stored for some, including the first, or all of the coefficients, and the secondary value for at least the first coefficient is combined with or replaces the primary value upon each occurrence of an incremental change of phase of said timing pulses and thus each time a timing variation in the conversion of the noise source signal occurs.

56. A method of cancelling noise according to claim 55, wherein some of the coefficients are formed from more than one secondary coefficient when a timing variation occurs and said secondary values are formed from the most significant terms of a Taylor approximation to the noise signal.

57. A full duplex modulator/demodulator (modem) including an echo canceller for cancelling noise in an input signal in a receive path due to transmission of an output signal, the echo canceller including a transversal digital filter having a plurality of coefficients, said modem including conversion means for converting a noise signal to produce said output signal, and means for controlling the operation of said conversion means in accordance with successive timing pulses and for incrementally adjusting the phase of said timing pulses and for providing a shift signal indicative of the occurrence of each of said incremental phase adjustments, wherein said noise undergoes timing variations as the conversion time phase of the modem is adjusted and wherein the coefficients are formed by a first stored primary value, and the first coefficient is instantaneously formed by a second stored secondary value upon receipt of a said shift signal.

58. A full duplex modem according to claim 57, wherein the secondary value is added to or subtracted from the primary value when a timing variation occurs.

59. In a duplex digital data communication system wherein a data signal is converted for transmission and the conversion is controlled in accordance with successive timing pulses which may be incrementally shifted in phase from time to time to compensate for timing signal variations and wherein a shift signal indicative of the occurrence of each such incremental phase shift is available, there is provided:
- an adaptive echo-cancelling circuit which uses a transversal filter with associated tap coefficient to generate an echo-cancelling signal; and
- a conversion time variation compensation circuit which is connected to change the first of the tap coefficients used by said echo-cancelling circuit upon receipt of each said shift signal and thus more quickly said echo-cancelling signal to phase shifting of said timing pulse occurrences.

60. A method of cancelling noise in an input signal in a receive path by modelling a noise path, wherein a noise source signal in the form of consecutive values is converted for transmission in accordance with timing pulses at a transmission rate, a plurality of said consecutive values are stored, each of the stored values is multiplied by a coefficient stored as a respective primary value, the products of said multiplication are combined to provide a noise cancellation signal, and the noise present in the input signal undergoes timing variations by incrementally changing the phase of said timing pulses, said method comprising the following steps:
(a) samping the input signal at recurring sampling times,
(b) incrementally changing the phase of said sampling times,
(c) storing a secondary value for some or all of the coefficients,
(d) combining or replacing the primary values of the coefficients with the secondary values of the coefficient upon each occurrence of an incremental change of phase of said sampling times, and
(e) combining or replacing the primary value of the first coefficient with the secondary value of that coefficent upon each occurrence of an incremental change of phase of said timing pulses.

61. A method of cancelling noise according to claim 60, further comprising the steps of:
(f) forming some of the coefficients from more than one secondary coefficient when a timing variation occurs, and
(g) forming said secondary values from the most significant terms of a Taylor approximation to the noise signal.

62. A full duplex modulator/demodulator (modem) including:
- an echo canceller for cancelling noise in an input signal in a receive path due to transmission of an output signal, the echo canceller including a transversal digital filter having a plurality of coefficients;
- send conversion means for converting a noise signal in a send path at successive conversion times to produce said output signal;
- means operatively coupled to said send conversion means for controlling the conversion times of said send conversion means in accordance with successive timing pulses and for incrementally adjusting the phase of said timing pulse and for providing a first shift signal indicative of the occurrence of each of said incremental phase adjustments of said timing pulses;
- receive sampling means connected to receive said input signal;
- means operatively coupled to said receive sampling means for controlling the sampling times of said receive sampling means in accordance with successive sampling times and for incrementally adjusting the phase of said sampling times and for providing a second shift signal indicative of the occurrence of each of said incremental phase adjustments of said sampling times,
- said noise under going timing variations as either or both of said conversion and sampling times of the modem is (are) incrementally adjusted in phase;
- means for (a) forming said coefficients in response to respective stored primary values, and (b) instantaneously forming at least the first of said coefficient in accordance with respective stored secondary values upon receipt of said first and second shift signals, and (c) instantaneously forming the first of said coefficient in accordance with the respective stored secondary value upon receipt of each first shift signal.

63. A full duplex modem according to claim 62, wherein the secondary values are added to or subtracted from the primary values when a timing variation occurs.

64. An arrangement as in claim 62, further including delay means for delaying the forming of coefficient such that at least a second of the coefficients is formed after a respective propagation delay(s) with respect to occurrence of said incremental phase adjustment.

65. In a duplex digital data communication system wherein a data signal is converted for transmission and the conversion times are controlled in accordance with successive timing pulses which may be incrementally shifted in phase from time to time to compensate for timing signal variations and a first shift signal indicative of the occurrence of each such incremental phase shift in conversion times is available, and wherein digital sample signals represent respective values of corresponding analog signals at sample times which may be incrementally shifted in phase from time to time to compensate for timing signal variations and wherein a second shift signal indicative of the occurrence of each such incremental phase shift in sample times is available, there is provided:
- an adaptive echo-cancelling circuit which uses a transversal filter with associated tap coefficient to generate an echo-cancelling signal; and a sample timing signal variation compensation circuit which is connected to change at least the first of the tap coefficients used by said echo-cancelling circuit upon receipt of each of said first and second shift signals and thus more quickly adapt said echo-cancelling signal to phase shifting of said timing occurrences.

66. A method of cancelling noise in an input signal in a receive path by modelling a noise path comprising the following steps:
(a) generating timing pulses establishing a transmission rate;
(b) converting a noise source signal in a transmit path in the form of consecutive values for transmission in response to said timing pulses;
(c) sampling the input signal in response to said timing pulses;
(d) incrementally changing the phase of timing pulses employed in said conversion and the phase of timing pulses employed in said sampling, thereby subjecting noise present in the input signal to timing variations;
(e) receiving and storing a plurality of said noise source signal consecutive values;
(f) providing a primary value coefficient and also providing a secondary value corresponding to said primary value coefficient;
(g) adapting the primary value coefficient in response to said secondary value upon each occurrence of an incremental change of phase of said timing pulses and thus each time a timing variation occurs;
(h) multiplying each of the stored values by said adapted primary value coefficient to provide products; and
(i) combining said products to provide a noise cancellation signal.

67. A method as in claim 66 further including delaying by a propagation delay the adapting of said primary value coefficient with respect to occurrence of said incremental change of phase of said timing pulses employed in said conversion.

68. Noise cancellation apparatus in a system for cancelling noise in an input signal in a receive path comprising:
a signal processor arranged to receive from a noise source in a transmit path a signal related to noise present in said input signal,
said signal processor including means to produce a cancellation signal substantially corresponding to said noise and means for subtractively combining said cancellation signal with said input signal,
said noise source including:
signal conversion means; and
means for timing the operation of the signal conversion means by recurring timing pulses;
said system further including:
means for sampling said input signal at recurring sampling times, and
means connected to said sampling means for incrementally changing the phase of said sampling times and for producing a shift signal indicative of the occurrence of each of said incremental phase changes of said sampling times and for applying said shift signal to said processor so as to provide said processor with a shift signal indicative of each timing variation occurring in the operation of said sampling means,
said processor including means to effect a compensatory variation in said cancellation signal corresponding to said incremental phase changes upon receipt of each shift signal.

69. Noise cancellation apparatus according to claim 68, and for use when said signal related to noise present in said input signal is in the form of consecutive samples each being a numerical value, wherein the signal processor includes a transversal digital filter means for storing samples as numerical values.

70. Noise cancellation apparatus according to claim 69, wherein some or all of the taps of the transversal filter have more than one adapted value for generating a coefficient.

71. A method of cancelling noise in an input signal in a receive path by modelling a noise path, wherein a noise source signal in the form of consecutive values is converted for transmission in accordance with timing pulses at a transmission rate, a plurality of said consecutive values are stored, each of the stored values is multiplied by a coefficient stored as a respective primary value, the products of said multiplication are combined to provide a noise cancellation signal, the input signal is sampled at recurring sampling times, the phase of said sampling times is incrementally changed, and wherein:
a secondary value is stored for some or all of the coefficients, and
the secondary value is combined with or replaces the primary value upon each occurrence of an incremental change of phase of said sampling times and thus each time a timing variation in the sampling of the input signal occurs.

72. A method of cancelling noise according to claim 71, wherein some of the coefficients are formed from more than one secondary coefficient when a timing variation occurs and said secondary values are formed from the most significant terms of a Taylor approximation to the noise signal.

73. A full duplex modulator/demodulator (modem) including an echo cancellor for cancelling noise in an input signal in a receive path due to transmission of an output signal, the echo canceller including a transversal digital filter having a plurality of coefficients, said modem including conversion means for converting a noise signal to produce said output signal, and means for controlling the operation of said conversion means in accordance with successive timing pulses, means for sampling the input signal, means for controlling the operation of said sampling means in accordance with successive sampling pulses and for incrementally adjusting the phase of said sampling pulses and for providing a shift signal indicative of the occurrence of each of said incremental phase adjustments, wherein said noise undergoes timing variations as the sample time phase of the modem is adjusted and wherein the coefficients are formed by a first stored primary value, and some coefficients are instantaneously formed by a second stored secondary value upon receipt of a said shift signal.

74. A full duplex modem according to claim 73 wherein the secondary values are added to or substracted from the primary values when a timing variation occurs.

75. In a duplex digital data communication system wherein a received data signal is sampled and the sampling is controlled in accordance with successive timing pulses which may be incrementally shifted in phase from time to time to compensate for timing signal variation and wherein a shift signal indicative of the occurrence of each such incremental phase shift is available, there is provided:

an adaptive echo-cancelling circuit which uses a transversal filter with associated tap coefficients to generate an echo-cancelling signal; and a sample time variation compensation circuit which is connected to change the tap coefficients used by said echo-cancelling circuit upon receipt of each said shift signal and thus more quickly adapt said echo-cancelling signal to phase shifting of said timing occurrences.

76. A method of cancelling noise in an input signal in a receive path by modelling a noise path, wherein a noise source signal in the form of consecutive values is converted for transmission in accordance with timing pulses at a transmission rate, a plurality of said consecutive values are stored, each of the stored values is multiplied by a coefficient stored as a respective primary value, and the products of said multiplication are combined to provide a noise cancellation signal, said method comprising the following steps:

(a) sampling the input signal at recurring sampling times, (b) incrementally changing the phase of said sampling times, (c) storing a secondary value for some or all of the coefficients, and (d) combining or replacing the primary value of a coefficient with the secondary value of that coefficient upon each occurrence of an incremental change of phase of said sampling times.

77. A method of cancelling noise according to claim 76 further comprising the steps of:

(e) forming some of the coefficients from more than one secondary coefficient when a timing variation occurs, and (f) forming said secondary values from the most significant terms a Taylor approximation to the noise signal.

78. In a duplex digital data communication system wherein a data signal is converted for transmission and the conversion times are controlled in accordance with successive timing pulses, wherein digital sample signals represent respective values of corresponding analog signals at sample times which may be incrementally shifted in phase from time to time compensate for timing signal variations and wherein a shift signal indicative of the occurrence of each such incremental phase shift in sample times is available, there is provided:

an adaptive echo-cancelling circuit which uses a transversal filter with associated tap coefficients to generate an echo-cancelling signal; and a timing signal variation compensation circuit which is connected to change the tap coefficients used by said echo-cancelling circuit upon receipt of each said shift signal and thus more quickly adapt said echo-cancelling signal to phase shifting of said timing occurrences.

79. A method of cancelling noise in an input signal in a receive path by modelling a noise path comprising the following steps:

(a) generating timing pulses establishing a transmission rate;

(b) converting a noise source signal in a transmit path in the form of consecutive values for transmission in response to said timing pulses;

(c) sampling the input signal in response to said timing pulses;

(d) incrementally changing the phase of generated timing pulses employed for sampling thereby subjecting noise present in the input signal to timing variations;

(e) receiving and storing a plurality of said noise source signal consecutive values;

(f) providing a primary value coefficient and also providing a secondary value corresponding to said primary value coefficient;

(g) adapting the primary value coefficient in response to said secondary value upon each occurrence of an incremental change of phase of said timing pulses and thus each time a timing variation in the sampling of the input signal occurs;

(h) multiplying each of the stored values by said adapted primary value coefficient to provide products; and (i) combining said products to provide a noise cancellation signal.

80. An arrangement as in either claim 39 or claim 52, wherein said means to produce a cancellation signal comprises a transversal filter having at least a second stage, and said compensation means includes delay means for delaying the application of the shift signal to said at least second stage by a respective propagation delay time(s), said shift signal so applied being indicative of an incremental phase change of timing pulses of signal conversion means arranged to convert the noise source signal for transmission.

81. An arrangement as in any of claims 51, 59 and 65, wherein said compensation circuit includes delay means for delaying the change of at least the second of the tap coefficients by a respective propagation delay time(s) with respect to occurrence of said incremental phase shift of said timing pulses.

82. An arrangement as in either claim 49 or claim 57, further including delay means for delaying the forming of at least a second of the coefficients by a respective propagation delay(s) with respect to occurrence of said incremental phase adjustment of said conversion times of converting said output signal.

83. A method as in any one of claims 46, 47, 60 and 61, further including delaying the combining or replacing of at least a second of said primary values by a respective propagation delay(s) with respect to occurrence of said incremental phase change of said conversion times.

84. A method as in either claim 55 or claim 56, further including delaying the combining or replacing of at least a second of said primary values by a respective propagation delay(s) with respect to occurrence of said incremental phase change of said timing pulses.

85. An arrangement as in any one of claims 49, 51, 57, 62, and 73 further including means for adapting said primary value in response to said secondary value.

86. A method as in any one of claims 46, 47, 55, 56, 60, 61, 71, 72, 76 and 77 further including adapting said primary value in response to said secondary value.

* * * * *